United States Patent [19]
Karbachsch et al.

[11] Patent Number: 5,034,125
[45] Date of Patent: Jul. 23, 1991

[54] MEMBRANE FILTERING DEVICE FOR MICRO AND ULTRA FILTRATION OF FLUIDS BY THE CROSSFLOW METHOD

[75] Inventors: Massoud Karbachsch, Gottingen; Wilfried Kaul, Weinsheim; Gerhard Strohm, Oestrich-Winkel, all of Fed. Rep. of Germany

[73] Assignee: Seitz-Filter-Werke Theo & Geo Seitz GmbH and Co., Bad Kreuznach, Fed. Rep. of Germany

[21] Appl. No.: 526,308

[22] Filed: May 21, 1990

[30] Foreign Application Priority Data

May 20, 1989 [DE] Fed. Rep. of Germany ....... 3916511

[51] Int. Cl.$^5$ ............................................ G01D 63/04
[52] U.S. Cl. .................................. 210/321.8; 55/158; 210/321.89; 210/500.23
[58] Field of Search ............... 55/158, 16; 210/321.72, 210/321.78, 321.79, 321.8, 321.81, 321.87, 321.88, 321.89, 321.9, 500.23

[56] References Cited

U.S. PATENT DOCUMENTS 4,237,596 12/1980 Hughes et al. ...................... 55/158

FOREIGN PATENT DOCUMENTS 3023681 2/1981 Fed. Rep. of Germany .
8801895 3/1988 World Int. Prop. O. .

Primary Examiner—Frank Sever
Attorney, Agent, or Firm—H. Gibner Lehmann; K. Gibner Lehmann

[57] ABSTRACT

A membrane type filtering device has modules containing bundles of capillary tubular membranes. To meet various filtration problems the modules have double accesses located at the two end faces of the module housings. Connections to these accesses are made by plugging in the module ends into flow distributor heads, which can be of two types whereby the crossflow can be selectively conducted either through the internal passages of the capillary membranes or else along the outsides of the capillary membranes. Appropriate matching is achieved by exchangeable inserts and exchangeable intermediate tension plates and end tension plates.

29 Claims, 10 Drawing Sheets

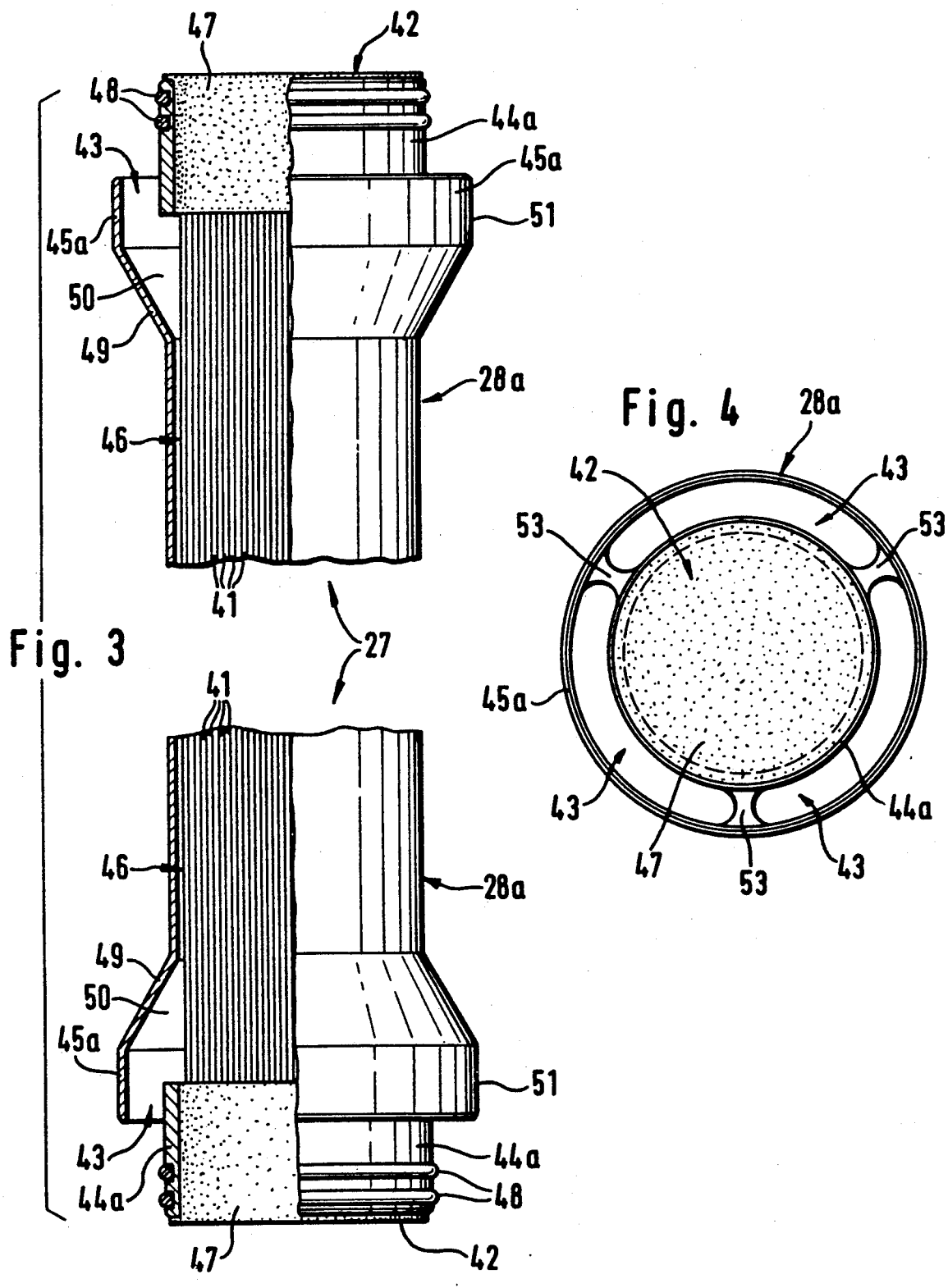

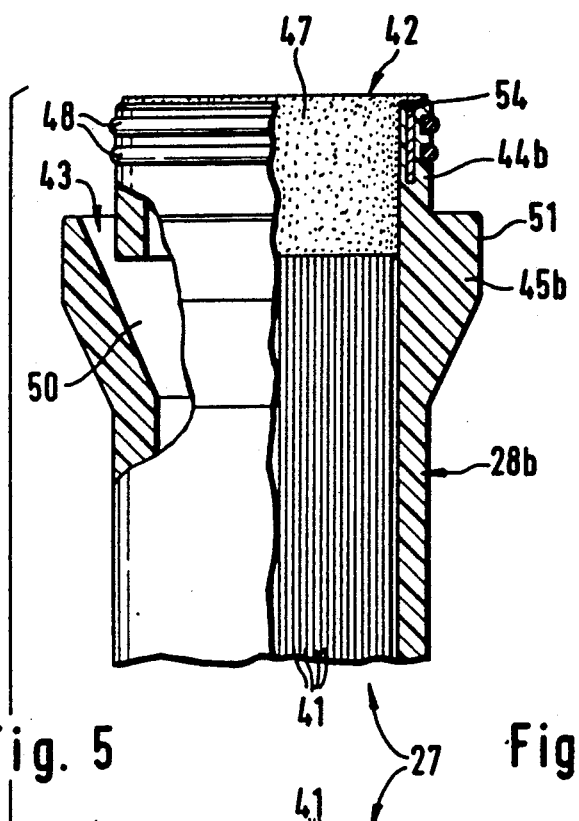
Fig. 5
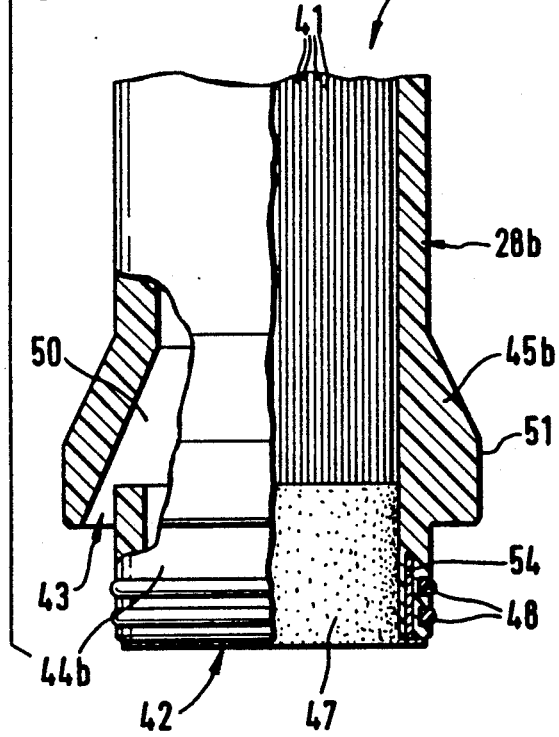
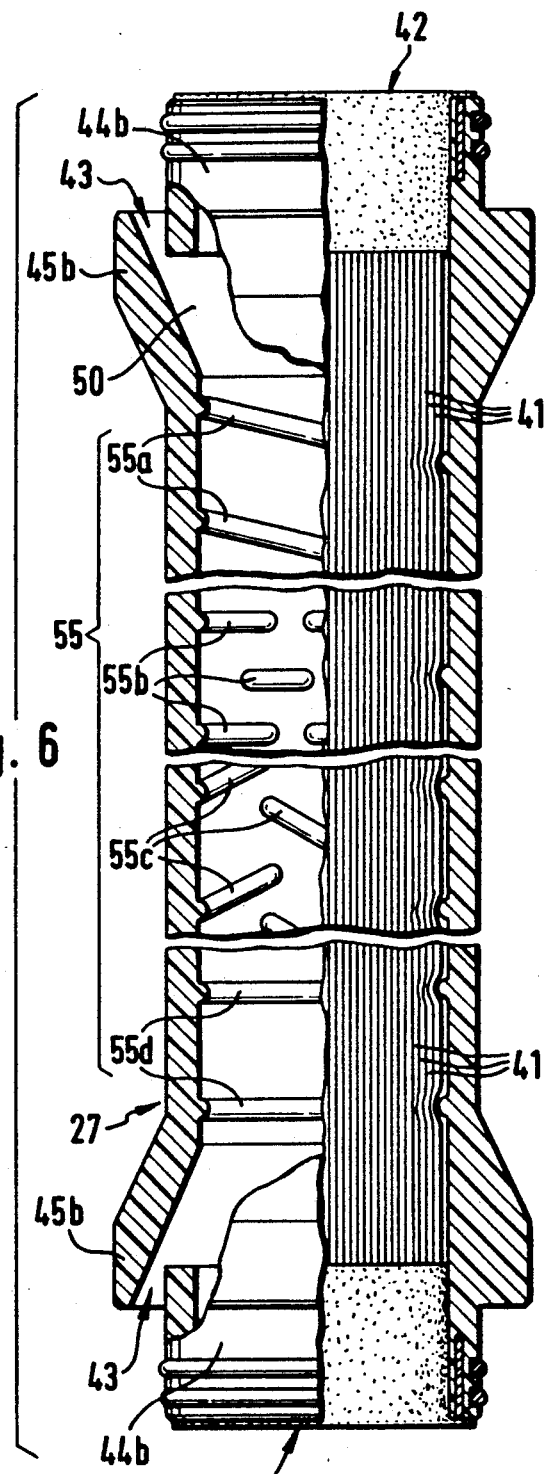
Fig. 6

SECTION 8a-8a   SECTION 8b-8b

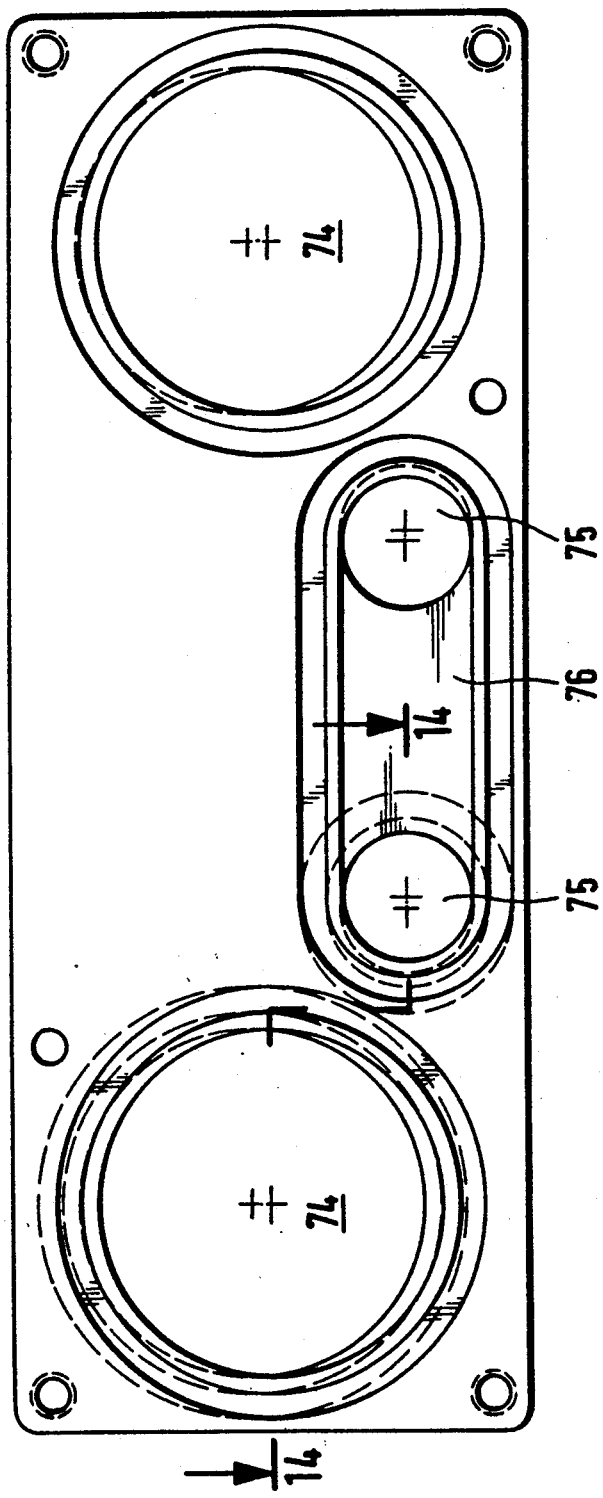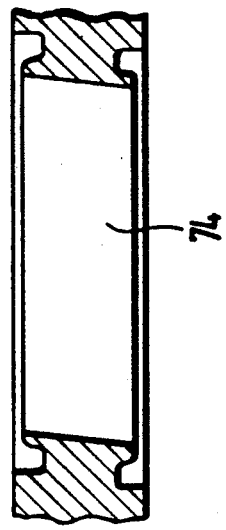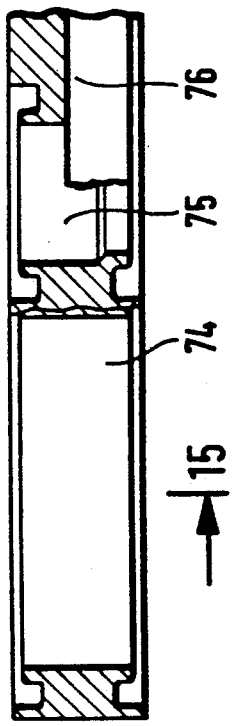
Fig. 13
Fig. 15
Fig. 14

MEMBRANE FILTERING DEVICE FOR MICRO AND ULTRA FILTRATION OF FLUIDS BY THE CROSSFLOW METHOD STATEMENT AS TO RIGHTS TO INVENTIONS MADE UNDER FEDERALLY-SPONSORED RESEARCH AND DEVELOPMENT.

Research and development of the present invention and application have not been Federally-sponsored, and no rights are given under any Federal program.

CROSS REFERENCES TO RELATED APPLICATIONS

The present application claims priority under 35 USC 119 of West German Application No. P 39 16 511.6 filed May 20, 1989.

BACKGROUND OF THE INVENTION

1. Field of the Invention

This invention relates generally to membrane-type filtering devices.

2. Description of the Related Art Including Information Disclosed Under 37 CFR §§1.97-1.99

In particular the invention relates to a membrane filtering device for the micro and ultra filtration of fluids by the crossflow method, with at least one membrane filter module containing capillary or hollow fiber membranes in the form of a bundle in a tubular filter housing, said membrane filter module having a pair of flow distributor heads attached to both filter housing ends and having flow distributor plates which are to be attached to the flow distributor heads and to line connectors that lead to the required operating devices intended to maintain a controlled fluid circulation through the membrane filter module, thereby to effect a controlled replenishment of the fluid to be treated and a discharge of the filtrate and of the substances being filtered out.

A membrane filtering device and a membrane filter module of the above described kind are known from WO 88/01895, for instance. In the membrane filter module known from this publication there is present at the two module faces only one access each to the respective bundle face, i. e. to the interior of the capillary or hollow fiber membranes. The access to the interior of the filter housing and to the outside of the capillary or hollow fiber membranes is located laterally on a side in the filter housing end area. Provision is made for the fluid to be treated to be fed into such lateral openings at one end of the filter housing and, after the fluid has passed the outside of the capillary or hollow fiber membranes, it is discharged, again at lateral openings at the other filter housing end.

The filtrate removed from the fluid is taken off at the bundle faces and transferred into filtrate lines connected thereto. But membrane filtering devices of this type have the considerable disadvantage that they can be operated only in a manner determined in advance. This applies in particular to applications in which the flow section or volume of the circulating fluid to be treated must be adjusted so as to be substantially greater than the flow section of the filtrate to be removed.

Similar situations and conditions also exist in hollow fiber dialysis machines such as known from DE-PS 30 23 681, for example.

SUMMARY OF THE INVENTION

In contrast thereto, the invention is based on the task of creating the possibility, in a membrane filtering device of the above described kind and at the least possible equipmental expense, to provide, selectively, an operating mode in which the fluid to be treated is conducted either through the interior of the capillary or hollow fiber membranes and the filtrate is removed from the outside of the capillary or hollow fiber membranes, or else an operating mode in which the fluid to be treated is conducted on the outside of the capillary or hollow fiber membranes along their circumferential surface and the filtrate is removed from the interior of the capillary or hollow fiber membranes. Changing temperatures prevailing in the membrane filter medium and mechanical tensions should have no disadvantageous effect on the seal between the different flowing media.

This problem is solved by the following features:

(a) Two each accesses are formed on both end faces of the filter housing accommodating the bundle of capillary or hollow fiber membranes, said accesses being separated from each other and mutually leakproof, but both being disposed on the respective filter housing end face;

(b) one access on each filter housing end face leads to the bundle face which is firmly held together by cementing or fusing, but leaves the flow connection to the interior of the capillary or hollow fiber membranes open, while the second face access at the end face communicates with the interior of the filter housing and with the outside of the capillary or hollow fiber membranes facing this interior;

(c) the flow distributor heads attached to the two filter housing ends and containing the connecting channels to the face accesses of the filter housing are provided, regarding the disposition of their interior connecting channels, in different arrangements and the heads are interchangeable, while the flow distributor plate which is cooperable with the heads is selectively adaptable to the different arrangements in the flow distributor head designs. The accesses leading to the bundle faces of capillary or hollow fiber membranes can thus be disposed in the circulation path of the nonfiltrate and the accesses communicating with the interior of the filter housing can be connectable to the filtrate discharge line or, selectively, the accesses leading to the bundle faces of capillary or hollow fiber membranes can be connectable to the filtrate discharge line and the accesses communicating with the interior of the filter housing can be disposed in the circulation path for the nonfiltrate.

What the invention achieves is a specific flow geometry inside the filter membrane module which makes it possible to flood either the inner or the outer surfaces of the membranes, depending on the membrane type used. Capillary membranes of an inside diameter between 0.5 and 2 mm. as well as hollow fiber membranes with an inside diameter up to 0.5 mm. are acceptable. Besides adaptation of the operating mode to the membrane type used this also makes possible an improved adaptation to the fluid to be treated. The switch-over of the membrane filtering device from the one to the other operating mode is easily accomplished by exchanging some components, especially the flow distributor heads.

In a preferred embodiment of the invention there is formed behind each one of the filter housing face accesses a free space and, depending on the selection of the flow distributor heads, the spaces leading to the bundle faces of capillary or hollow fiber membranes, as distributing and collecting space for the nonfiltrate conducted through the capillary or hollow fiber membranes, and the spaces communicating with the filter housing interior, as collecting space for the filtrate or, selectively, the spaces leading to the bundle faces of capillary or hollow fiber membranes, as filtrate collecting space, and the spaces communicating with the filter housing interior, as distributing and collecting space for the nonfiltrate conducted along the outside of the capillary or hollow fiber membranes through the filter housing interior, are respectively connectable in the filter device, to carry out the necessary functions.

Preferred is the formation of separate accesses at each membrane filter module end face by means of an inner sleeve surrounding a central inlet and itself surrounded by an outer, annular access which is outwardly surrounded by an outer membrane and leads along the inner membrane and the bundle of capillary or hollow fiber membranes to the filter housing interior. The two membrane bundle ends may be gathered in the one or the other inner filter housing sleeve and cemented so as to be leakproof by means of an elastic compound, or else fused leakproof in a plastomer, while the free space between the inner and the outer sleeve at both filter housing ends leads to the outside of the capillary or hollow fiber membranes.

The filter housing of the membrane filter module can consist of metal, in particular alloy steel, or else of plastic inert to the fluid to be treated. If the filter housing is plastic, the inner and/or outer sleeve can be reinforced by alloy steel rings not touching the product so as to counteract any expansion or shrinking of the plastomer on account of thermal or mechanical stresses.

The inner sleeve should project axially beyond the face of the outer sleeve, if possible so far that a ring seal placed on the outer circumferential surface of the inner membrane is unobstructed.

Within the scope of the invention, membrane filter modules intended exclusively for the one or the other operating modes could be provided. But membrane filter modules suited for both operating modes can also be provided so that the user can select the one or the other operating mode in accordance with the respective application. In that case, it is purposeful within the scope of the invention to design the cross-sections to the central face access and the cross-sectional area to the outer face access to the membrane filter module so as to be as universally applicable as possible.

When flooding the filter housing with the fluid to be treated, it is recommended to provide flow breakers in the form of barriers on the inside surface of the housing wall so that, when the outer membrane surface becomes flooded, strong turbulences develop to counteract deposit formation. In question here are helical barriers, but also wall baffles or tongues, or ring-shaped barriers.

Within the scope of the invention, the flow distributor heads are preferably designed so that only the end areas of the membrane filter modules, i. e. their inner and outer sleeves, need be inserted into the seating holes of the flow distributor heads. Sealing is provided by annular sealing elements contacting the circumferential surface of the sleeves. This gives the membrane filter modules limited, but considerable freedom to move axially relative to the flow distributor heads, thereby reducing or preventing thermal and mechanical tensions.

The flow distributor heads are preferably constructed so as to have two essentially planar side surfaces and to have distributor channels extending from one side surface to the other side surface and communicating with chambers formed in the membrane filter module seating hole. The mouth of the through channels can be provided with an aseptic seal at one side surface of each flow distributor head and with a smooth, flat bearing surface for a seal on the other side surface. This makes it possible to catenate a multiplicity of such flow distributor heads. This can yet be facilitated and improved by providing in each flow distributor head a through seating hole, extending parallel to the through channels, for a carrying and tension rod. The provision of two carrying and tension rods with catenated flow distributor heads and membrane filter modules inserted between them results in a membrane filter arrangement in which the membrane filter modules are held securely in their operating position without being clamped firmly. Rather, the two rows of flow distributor heads can be kept at such a mutual spacing by means of the flow distributor plates fixed at one end of these two rows, and tension end plates mounted at the opposite ends, and spaced between them intermediate tension plates so that the membrane filter modules have limited axial mobility, but are kept securely sealed between two flow distributor heads each in any position whatever. Even when temperature fluctuations are relatively great in operation, such as when sterilizing the membrane filter bundles with steam, no thermal or mechanical twisting occurs at the membrane filter modules and the flow distributor heads, so that any danger of leakage or other malfunctions is safely prevented.

The flow and distributor heads, strung up on the carrying and tension rods, can be pushed against their mutually facing side surfaces while remaining securely sealed, for instance by means of springy compression devices.

The flow distributor heads can be provided in two types, differing with respect to the connection of the through flow channels to the one or the other chamber in the seating hole for the membrane filter module. To switch from the one to the other operating mode it is only necessary to exchange one set of flow distributor heads for the alternate set, and to exchange an insert in the flow distributor end plate for an alternate insert in the flow distributor plate.

Within the scope of the invention, several such rows of filtering devices can be arranged in juxtaposition, it being possible for any two such juxtaposed filter arrangements to have joint flow distributor end plates. It is then recommended to install the flow distributor heads so that their small diameter holes face each other. This facilitates the bunching of the smaller diameter through holes in the flow distributor end plate or in an insert thereof.

The invention also relates to a membrane filter module characterized in that the accesses at both ends are disposed on its end faces exclusively. Such a membrane filter module is a unit which can be handled with particular safety and ease and which can be designed with capillary or hollow fiber membranes while its basic construction remains virtually unchanged. Due to their interaction with flow distributor heads of different types, such membrane filter modules are applicable to the one or the other operating mode, depending on filter type and kind of application.

BRIEF DESCRIPTION OF THE DRAWINGS

Embodiment examples of the invention are described below in greater detail with reference to the drawings, in which:

FIG. 3 is a broken side elevational view of the end areas of a membrane filter module used in the device according to FIGS. 1 and 2, with alloy steel filter housing, partly sectioned axially.

FIG. 4 is an end face view of the membrane filter module according to FIG. 3.

FIG. 5 is a broken side elevational view of the end areas of a membrane filter module used in the device according to FIGS. 1 and 2, employing a plastic filter housing, partly sectioned axially.

FIG. 6 is a broken side elevational view of a membrane filter module according to FIG. 5, revealing modified embodiments.

FIG. 13 is an elevational view of an insert of a first kind for a flow distributor end plate according to FIGS. 11 and 12.

FIG. 14 is a section on line 14—14 of FIG. 13.

FIG. 15 is a section on line 15—15 of FIG. 14.

DESCRIPTION OF THE PREFERRED EMBODIMENTS

Figure 1:
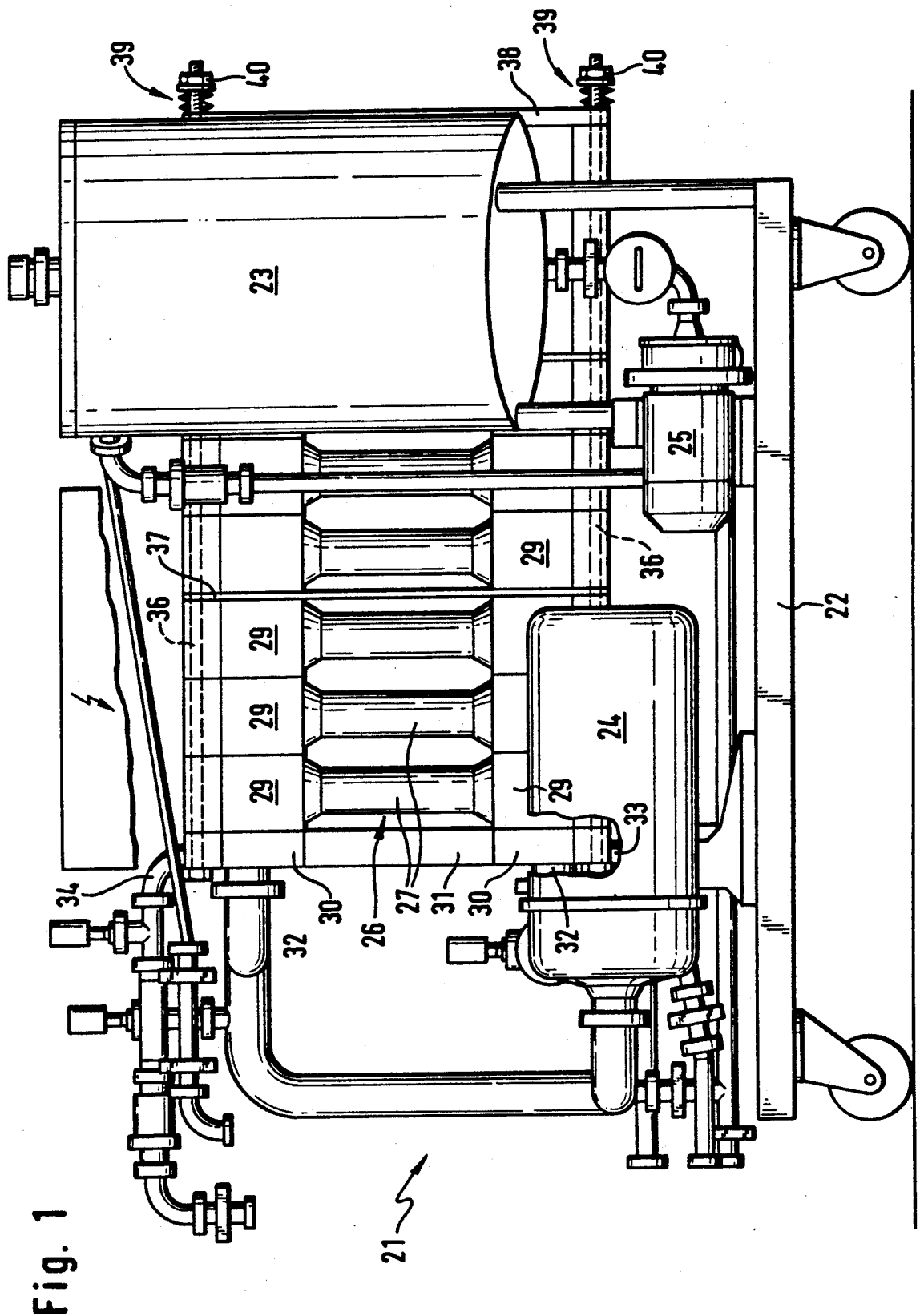
FIG. 1 shows a membrane filtering device according to the invention in the form of a mobile piece of equipment in side view, the switch box and the circulating pump of the machine being broken away in part.

The embodiments of the invention involve a membrane filtering machine 21 for the treatment of beverages, e. g. wine. Mounted on a portable frame 22 are a liquid tank 23, a circulating pump 24, and a feed pump 25 for the liquid to be treated. The frame 22 also carries the actual filtering device 26, including the necessary line connectors and connecting lines.

Figure 2:
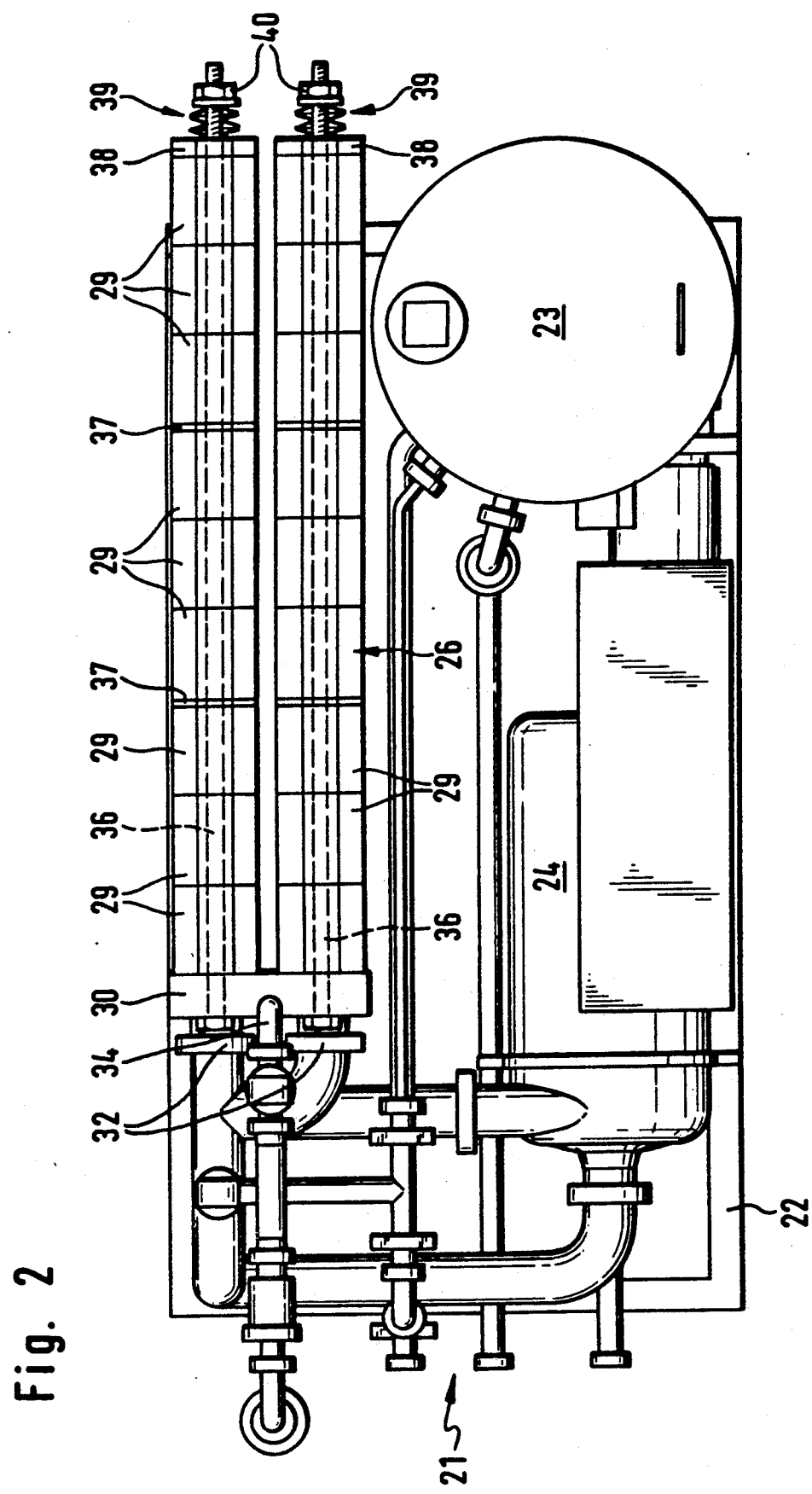
FIG. 2 is a top view of the membrane filtering device of FIG. 1.
Figure 11:
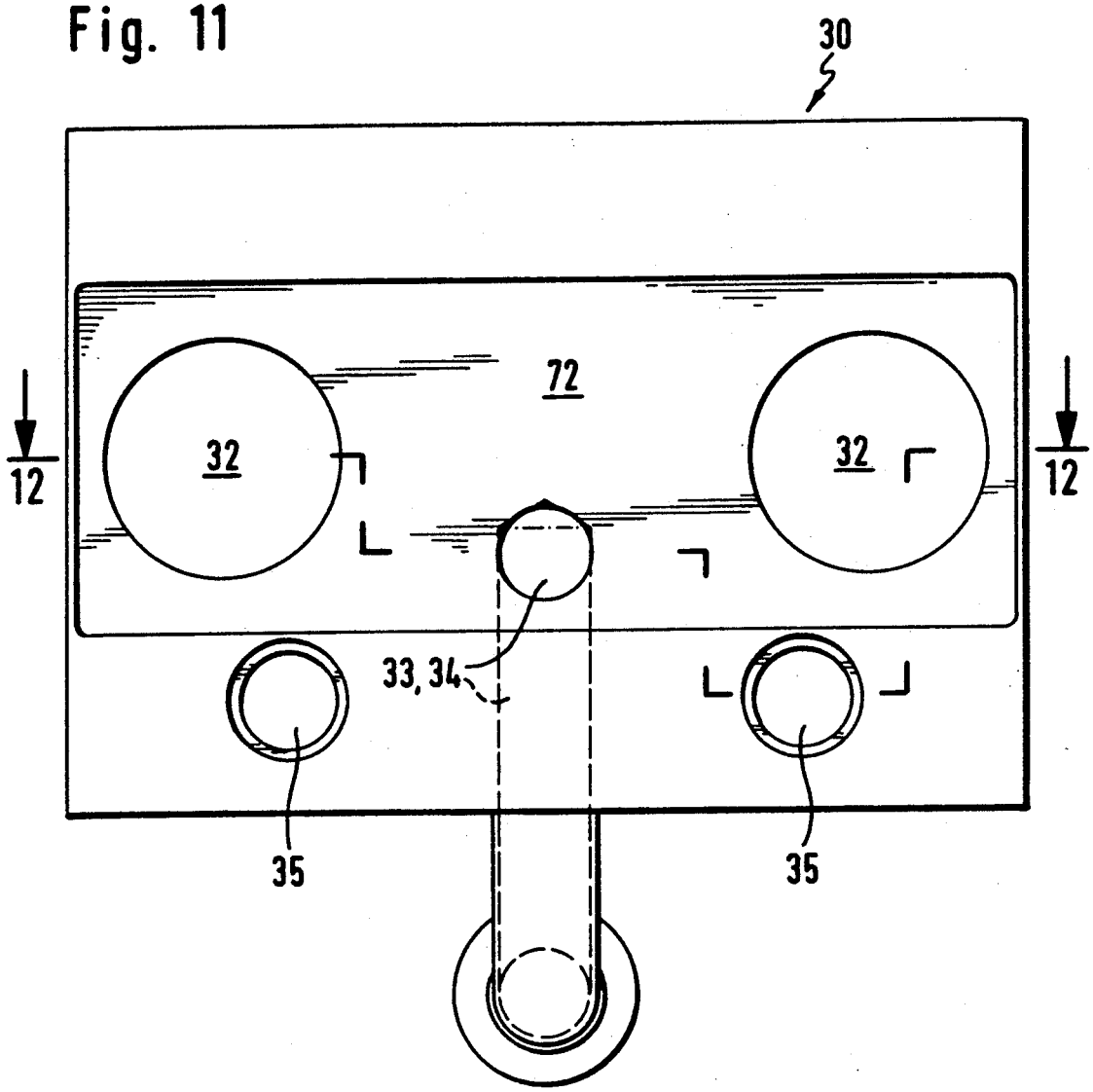
FIG. 11 is an elevation of a flow distributor end plate of the machine according to FIGS. 1 and 2, in rear view.
Figure 12:
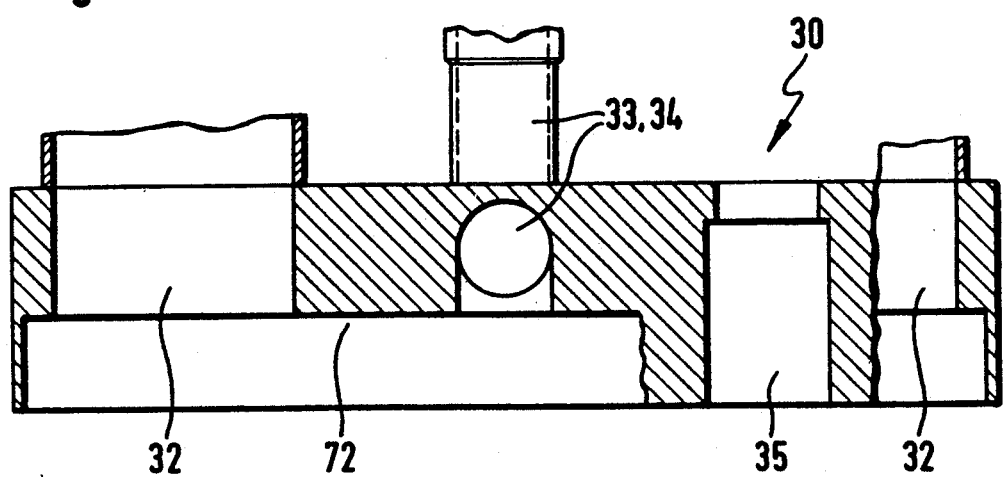
FIG. 12 is a sectional view of the flow distributor end plate according to FIG. 11, in section 12—12 of FIG. 11.

The actual filtering device 26 is constructed of membrane filter modules 27, each having a tubular filter housing 28a or 28b (FIGS. 3-6). Attached to each end of each membrane filter module is a flow distributor head 29. The membrane filter modules 27 in the example shown are arranged vertically in such a manner that the opposite side surfaces of the flow distributor heads 29 are closely catenated to form an upper row and a lower row while the membrane filter modules 27 extend between the upper and lower rows of heads. As FIG. 2 shows, two rows of membrane filter modules are provided in the example shown, with two upper rows of flow distributor heads 29 and two lower rows of flow distributor heads 29. In this example, the filtering device 26 has a flow distributor plate 30 attached to the two upper rows of flow distributor heads 29 and, likewise, a flow distributor plate 30 attached to the two lower rows of flow distributor heads. Both flow distributor plates 30 are fixed to the frame 22 by means of a carrying frame 31. The two flow distributor plates 30 support the connectors 32 for the liquid circulation. Mounted to the underside of the lower flow distributor plate 30 is the filtrate discharge 33, and to the upper flow distributor plate 30 is mounted the aerating and venting connector 34 in the same arrangement and design so that, with appropriate valve settings, the connector 34 can alternately be used as a filtrate discharge and the part 33 merely as an emptying connector. The flow distributor plates 30 are provided with seating holes 35, FIGS. 11 and 12, for permanent, rigid assembly of carrying and tension rods 36, so that two carrying and tension rods 36 extend from each flow distributor plate 30 in parallel position horizontally in the desired mutual spacing of the two rows of membrane filter modules 27 and flow distributor heads 29. The flow distributor heads 29 are catenated on and compressed over the length of these carrying and tension rods 36 which are indicated in FIGS. 1 and 2 by dashed lines. For better stability there are inserted at intervals, for instance after each group of three flow distributor heads 29, intermediate tension plates 37, each extending from an upper carrying and tension rod 36 to a lower carrying and tension rod 36. At the end of the respective row of catenated flow distributor heads 29 is an end tension plate 38 which forms at the same time the liquid-tight termination of the upper and lower rows of flow distributor heads 29 as well as the abutment for a tensioning device or spring 39 and tightening nut 40 on the end of the carrying and tension rod 36. Each end tension plate 38 extends, in the example shown, parallel to the intermediate tension plates 37 from an upper carrying and tension rod 36 to a lower carrying and tension rod 36. Due to the interaction between the permanently and rigidly installed carrying and tension rods 36 and the intermediate tension plates 37, the end tension plates 38 and the tensioning devices 39, a strong, stable construction of the filtering device is assured. By designing the tensioning devices 39 so as to be axially flexible it is made certain that the flow distributor plates 30, the intermediate tension plates 37 and the end tension plates 38 are constantly pressed against the side surfaces of the flow distributor heads 29 and the flow distributor heads 29 against each other, especially also with respect to thermal expansion and tensions such as occur when disinfecting and degerming the filtering device by means of steam currents.

As FIGS. 3-6 show, the membrane filter modules 27 each have a tubular filter housing 28a or 28b, each accommodating a bundle of capillary or hollow fiber membranes 41. These capillary or hollow fiber membranes 41 are selected in accordance with the filtration task at hand and, as hollow fiber membranes, may have an inside diameter up to 0.5 mm. and, as capillary membranes, an inside diameter between 0.5 and about 2 mm. The choice of capillary or hollow fiber membranes 41 determines the type of the respective membrane filter module, whereas the filter housing 28a or 28b is the same for all types of membrane filter modules 27, at least as far as its external design is concerned, thus permitting, without problem, substitution of membrane filter modules 27 of different types. This applies in particular to the design of the filter housing 28a or 28b at its end areas. A pair of accesses is provided at each end area of the membrane filter module 27, namely one central access 42 leading to the inner passages of the capillary or hollow fiber membranes 41, and one annular access 43 which surrounds the central access 42 annularly and leads to the outside of the capillary or hollow fiber membranes 41 or to the interior of the tubular filter housing 28a or 28b. In the example shown, the two accesses 42 and 43 are formed by the provision of two axial sleeves, namely one inner sleeve 44a or 44b and one outer sleeve 45a or 45b. The bundle of capillary or hollow fiber membranes 41 goes through the interior 46 of the tubular filter housing 28a or 28b up into the inner sleeve 44a or 44b. Inside the inner sleeve 44a or 44b, the end area of the capillary or hollow fiber membrane 41 bundle is cemented by means of an elastic, leakproof compound to form a plug 47, or it is fused to be leakproof in a plastomer. After cementing or fusing, the face of the capillary or hollow fiber membrane 41 bundle or of the plug 47 is cut off so that the inlets to the passages of the capillary or hollow fiber membranes 41 are opened up again.

The inner sleeve 44a or 44b projects axially beyond the outer sleeve 45a or 45b far enough that at least one sealing element, such as an O-ring 48, can be put on the projecting part. The annular access 43 formed between the inner sleeve 44a or 44b and the outer sleeve 45a or 45b projects radially beyond the interior 46 of the tubular filter housing 28a or 28b and merges or tapers (transitions) into the interior 46 of the filter housing 28a or 28b by means of a conical wall 49, whereby an essentially annular free space 50 is formed between the access 43 and the interior 46 of the filter housing 28a or 28b. The cylindrical outside diameter 51 of the outer sleeve 45a or 45b interacts with a ring seal 52 provided in the flow distributor head 29 or 29a or 29b (see FIGS. 7-10).

The filter housings 28a of the membrane filter modules 27 according to FIGS. 3 and 4 can consist of alloy steel, the sleeves 44a and 45a being formed of alloy steel rings and kept in coaxial position by fixed spacers 53. The pair of sleeves thus formed is then welded to the tube wall of the filter housing 28a by means of the conical wall 49.

In the examples of FIGS. 5 and 6, the filter housing 28b consists of plastic that si inert to the fluid to be treated, such as a polyolefin. Differing from the alloy steel filter housing per FIGS. 3 and 4, the filter housing 28b can be a onepiece molding. But it is also possible to mold the unit consisting of inner sleeve 44b, outer sleeve 45b, spacers and conical wall in a single piece and to glue or fuse it to both ends of the tubular portion of the filter housing. In variance from the alloy steel filter housing 28a, it is preferable to reinforce the inner sleeve 44b with an alloy steel ring 54 when molding the plastic filter housing 28b to counteract an expansion or shrinkage of the plastic due to thermal stresses. A corresponding reinforcement of the outer sleeve 45b with an alloy steel ring can also be provided. In any case, however, the alloy steel ring 54 should be embedded so as to avoid all contact with the product, e. g. wine.

As FIG. 6 shows, flow breakers 55 can be mounted or provided inside the filter housing 28b. These flow breakers 55 can be designed, for example, as one or several spirals 55a, or as staggered, peripheral ribs 55b, or ribs 55c arranged in fish bone fashion, or peripheral ribs 55d. In the example of FIG. 6, these flow breakers are molded directly to the inside surface of the tubular portion of the filter housing 28b. If the filter housing 28a consists of metal, in particular alloy steel, such flow breakers can be welded to the inside surface of the tubular filter housing part.

Figure 7:
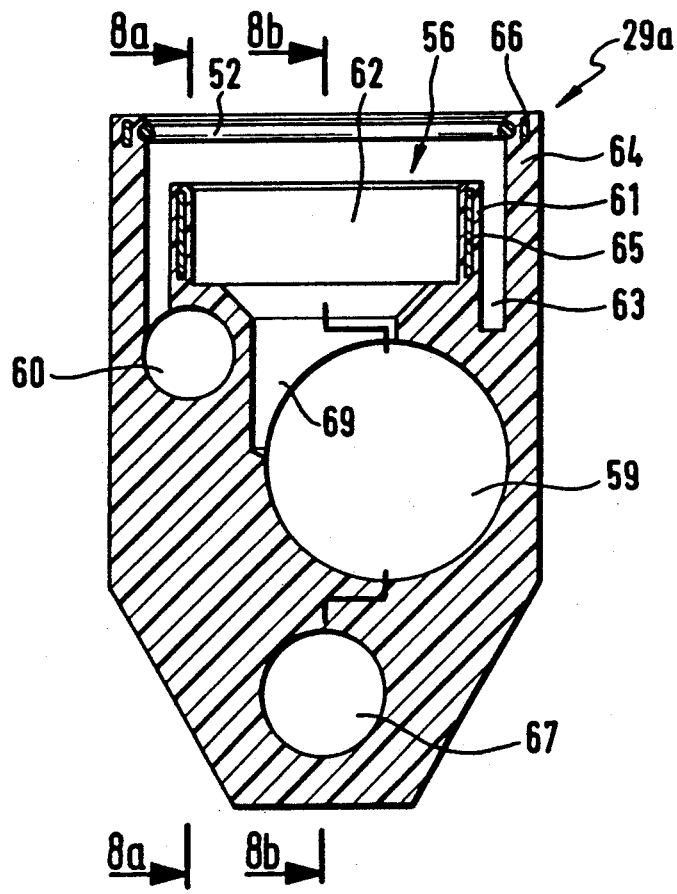
FIG. 7 is a vertical section of a flow distributor head of a first kind, to be used with the membrane filter module according to FIGS. 3-6, in section 7—7 of FIG. 8.
Figure 8:
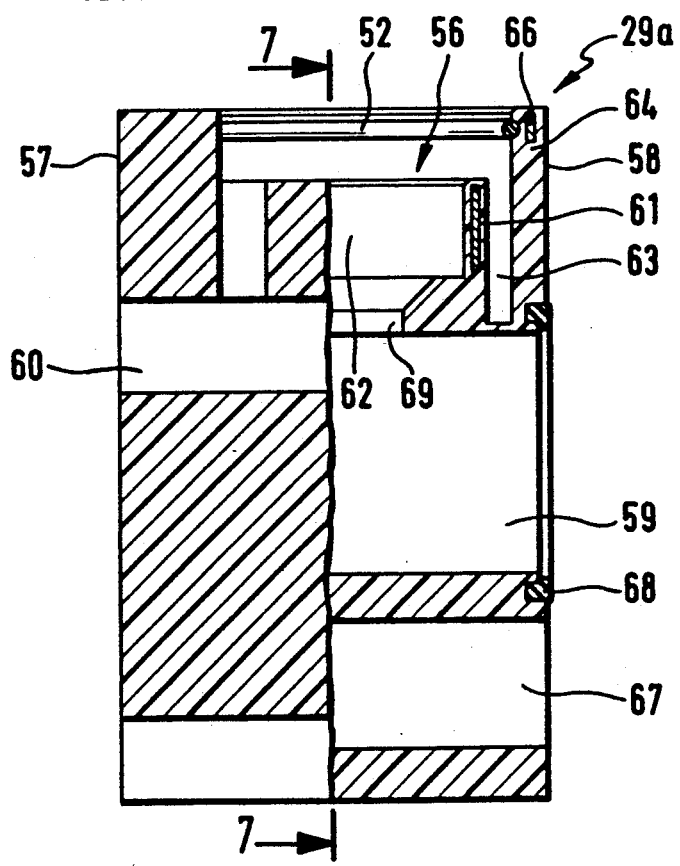
FIG. 8 is a vertical section of the flow distributor head according to FIG. 7, in sections 8a—8a and 8b—8b of FIG. 7.
Figure 9:
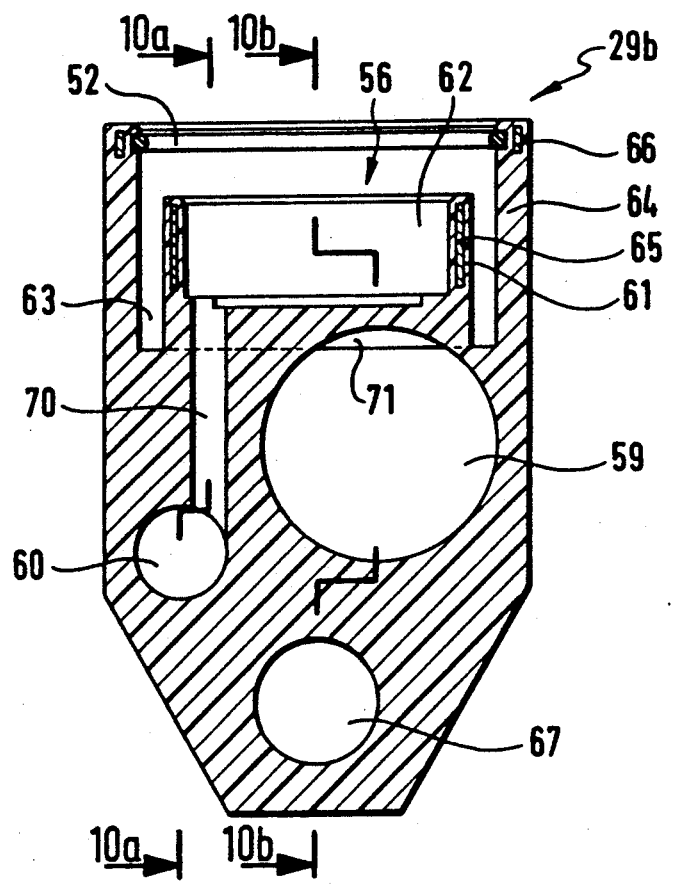
FIG. 9 is a vertical section of flow distributor head of a second kind, to be used in conjunction with membrane filter modules according to FIGS. 3-6, in section 9—9 of FIG. 10.
Figure 10:
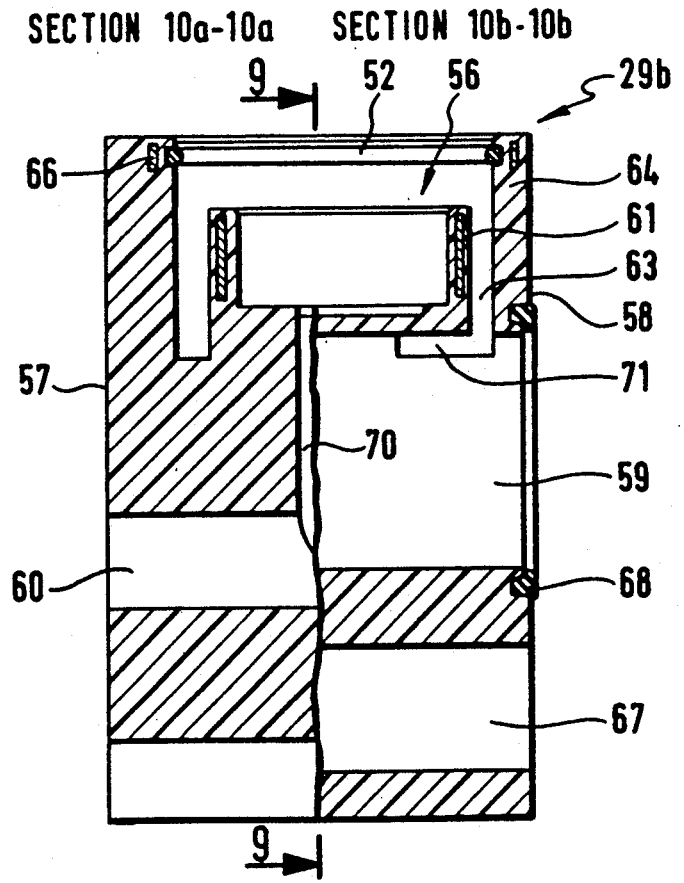
FIG. 10 shows sections of the flow distributor head of the second kind according to FIG. 9, in sections 10a—10a and 10b—10b of FIG. 9.

FIGS. 7-10 show two different designs of the flow distributor heads for use in a membrane filtering machine 21 according to FIGS. 1 and 2. If it is intended to arrange the capillary or hollow fiber membranes 41 so that their inner passages are in the circulating flow of the liquid to be treated, flow distributor heads 29a of the design according to FIGS. 7 and 8 must be used. On the other hand, if it is intended to conduct the flow of the liquid to be treated along the outside of the capillary or hollow fiber membranes 41, the flow distributor heads 29b according to FIGS. 9 and 10 are to be used. In both cases, one end face of the flow distributor heads 29a, 29b, respectively, has a seating hole 56 to introduce one end of a filter housing 28a or 28b of a membrane filter module 27. Furthermore, each flow distributor head 29a or 29b has two mutually opposite, parallel side surfaces 57 and 58, between which extend flow channels 59 and 60 perpendicular to the seating hole 56. By means of an inner sleeve 61 the seating hole 56 is divided into two chambers corresponding to the face accesses 42 and 43 (FIGS. 36) of the filter housing 28a or 28b, namely a central chamber 62 and an annular chamber 63. The inner sleeve 61, separating the central chamber 62 and the annular chamber 63 from each other, is designed so as to accommodate the inner sleeve 44a or 44b of the filter housing 28a or 28b, the sealing elements 48 placed on the inner sleeve 44a or 44b interacting with the inside surface of the inner sleeve 61. The sleeve-like peripheral wall 64 constitutes an outwardly facing portion or rim of the flow channel 63. Such wall, which surrounds the annular chamber 63 supports, at the inlet into the seating hole 56, the ring seal 52 engaging the outside diameter 51 of the outer sleeve 45a or 45b of the filter housing 28a or 28b. Since the flow distributor heads 29a, 29b in the examples of FIGS. 7-10 are made of plastic, in particular polyolefin, the inner sleeve 61 and the peripheral wall 64 are reinforced by embedded metal rings, in particular alloy steel rings 65, 66. The flow channel 62 which contains the ring 65 has a rim which constitutes an outwardly facing portion or rim of the channel.

There is an eye 67 in the form of a through hole going from the side surface 57 to the side surface 58. It is with this eye 67 that the flow distributor heads 29a, 29b are strung up on the respective carrying and tension rods 36. At the one side surface 58, the through flow channels 59 and 60 are surrounded by aseptic sealing rings such as at 68 which engage the smooth side surface 57 of the adjacent flow distributor head 29a or 29b. In the flow distributor heads 29a of the first type shown in FIGS. 7 and 8, the flow channel is of large section, intended to conduct the circulating fluid to be treated, and communicates via an intermediate channel 69 with the central chamber 62, whereas the flow channel 60 of smaller section for the discharge of the filtrate communicates with the annular chamber 63. Differing therefrom, the central chamber 62 of the flow distributor heads 29b of the second type, as shown in FIGS. 9 and 10, is connected to the flow channel 60 of smaller section, while the annular chamber 63 communicates via a section 71 with the flow channel 59 of larger section.

If the intention is to conduct the fluid to be treated through the inner passages of the capillary or hollow fiber membranes, a set of flow distributor heads 29a per FIGS. 7 and 8 is used. On the other hand, if the intention is to conduct the fluid to be treated along the outside of the capillary or hollow fiber membranes 41 through the filter housing, a set of flow distributor heads 29b per FIGS. 9 and 10 is used.

As a comparison of FIGS. 7 and 8 with FIGS. 9 and 10 demonstrates, the arrangement of the flow channels 59 and 60 in the flow distributor heads 29a of the first type is somewhat different from the arrangement of the flow channels 59 and 60 in the flow distributor heads 29b. In order to adapt the flow distributor plates 30 carried by the membrane filtering machine to the flow distributor heads 29a or the flow distributor heads 29b, which can be used selectively, the sides of the flow distributor plates 30 facing the flow distributor heads 29 to be attached to them are provided with a recess 72 each in which an exchangeable insert 73a or 73b is insertable for adaptation to the respectively used type of flow distributor heads 29a or 29b. For use in connection with flow distributor heads 29a, an insert 73a according to FIGS. 13–15 must be provided. Since in an arrangement of two rows of membrane filter modules 27 the flow distributor heads 29a must be assembled so that their flow channels 60 of smaller section face each other, the insert 73a has at its two outer areas a passage 74 each, which is somewhat inclined in order to adapt the height level of the flow channel 59 in the attached flow distributor heads 29a to the height level of the respective circulating liquid connection 32. Formed in the central portion of the insert 73 of the first type are two connecting holes 75 for the flow channels 60 of the two attached flow distributor heads 29a which merge (transition), as FIG. 14 shows, into a central connection 76 leading to the filtrate discharge 33 or to the aerating and venting connection 34. All passages, connecting holes and the central connection are surrounded by sealing elements.

Figure 16:
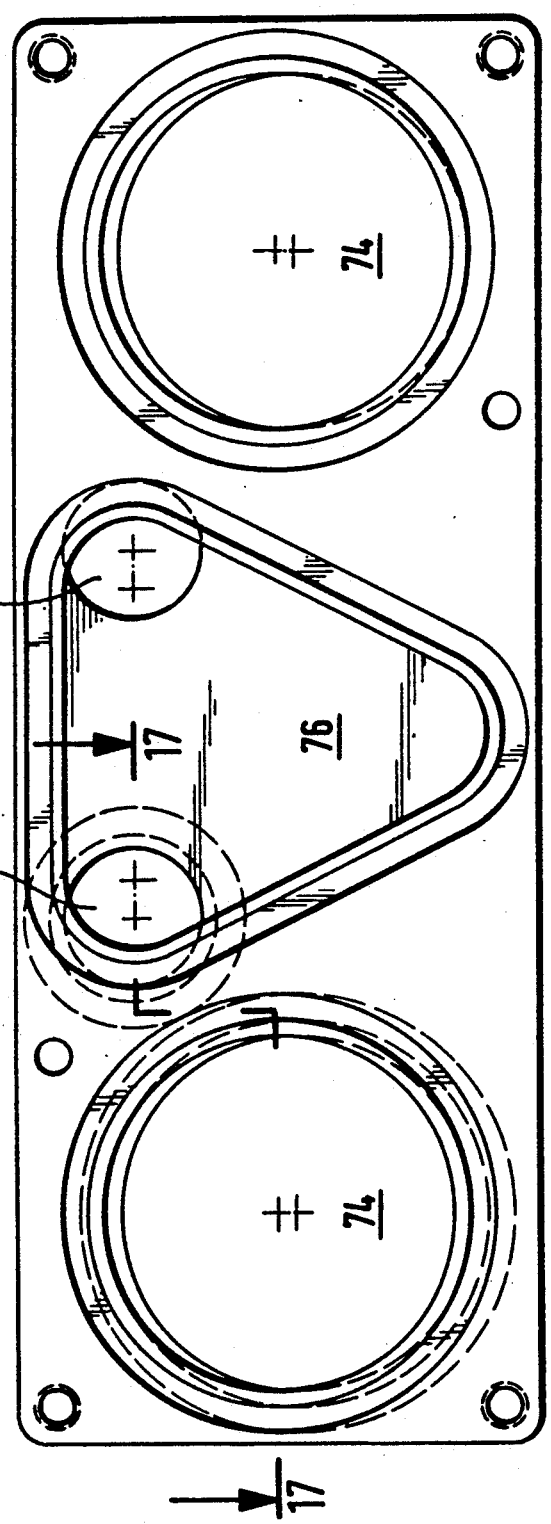
FIG. 16 is an elevational view of an insert of a second kind for a flow distributor end plate according to FIGS. 11 and 12.
Figure 18:
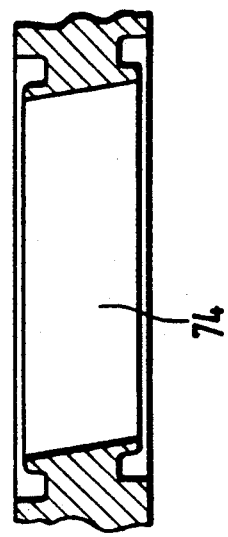
FIG. 18 is a section on line 18—18 of FIG. 17.
Figure 17:
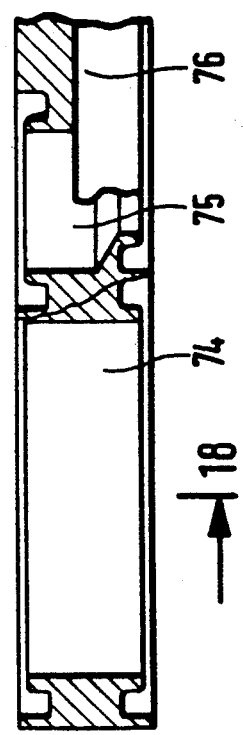
FIG. 17 is a section on line 17—17 of FIG. 16.

The design of the insert 73b, FIGS. 16–18, of the second type is such that two flow distributor heads 29b of the second type can be connected (FIGS. 9 and 10a). In this case also, the passages 74 are slanted in the sense of FIG. 18 (in the opposite sense as in the example of FIG. 15). The connecting holes 75 are located in this case in the upper part of the insert 73b. For adaptation to the filtrate discharge 33 or to the aerating and venting connection 34, the central connection 76 in the insert 73b of the second type is of triangular design.

Figure 19:
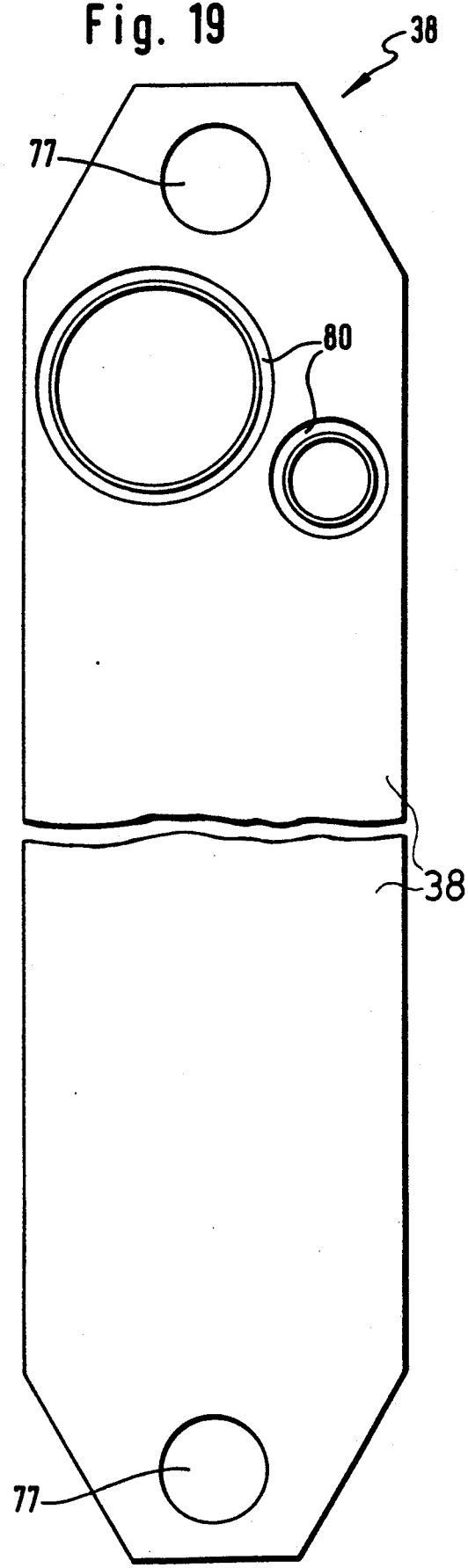
FIG. 19 is an elevational view of a tension end plate for a machine according to FIGS. 1 and 2, interrupted.

As FIG. 19 shows, the end tension plate 38 in the example shown is intended for vertical arrangement, having only one eye 77 each for the upper and the lower carrying and tension rod 36 (FIGS. 1 and 2) as breakthroughs. While one part of the end tension plate 38 has annular seating slots 80 for sealing rings to seal the flow channels 59 and 60 of the last flow distributor head 29, the other part has a smooth, uninterrupted surface because it is engaged by the sealing rings of the last flow distributor head.

Figure 20:
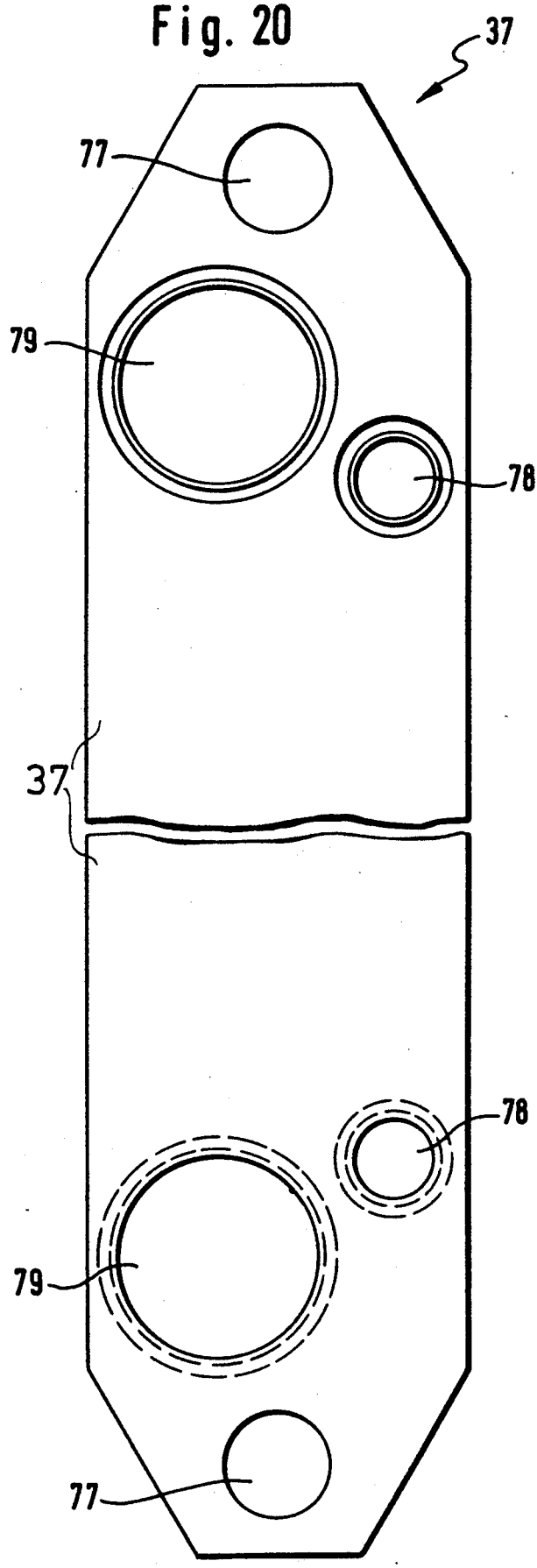
FIG. 20 is an elevational view of an intermediate tension plate for a machine according to FIGS. 1 and 2, partly interrupted.

According to FIG. 20, the intermediate tension plates 37 are of a design similar to that of the end tension plates 38. However, in addition to the eyes 77 there are also provided passages 78 corresponding to the flow channels 60 of the flow distributor heads 29 attached on both sides. The end tension plates 38 and the intermediate tension plate 37 show in FIGS. 19 and 20 are intended for use in connection with flow distributor heads 29a of the first type according to FIGS. 7 and 8. Modified intermediate tension plates 37 and end tension plates 38 must be provided in connection with the flow distributor heads 29b.

During the operation of the membrane filtering machine 21 shown in FIGS. 1 and 2 a steady circulation of the product to be treated, e.g. wine, is maintained by the circulating pump 24. The product circulated by the circulating pump 24 can be fed in, for example, through the upper flow distributor heads 29, i.e. through the connections 32 of the upper flow distributor plate 30 while the returning product is collected by the lower flow distributor heads 29 and returned to the circulating pump 24 through the connections 32 of the lower flow distributor plate 30. If flow distributor heads 29a per FIGS. 7 and 8 are used, the product to be treated is distributed in the upper row of flow distributor heads via the chambers 62 to the central accesses 42 of the membrane filter modules 27 and thence through the inner passages of the capillary or hollow fiber membranes 41 to reach, at the lower central access 42, the chamber 62 of the lower row of flow distributor heads 29a in order to be collected from there in the passages 59. The filtrate is discharged in this case at the annular accesses 43 of the membrane filter modules 27 into the annular chambers 63 of the upper row of flow distributor heads 29a and collected in their flow channels 60 in order to be delivered as an end product through the fixture attached to the upper flow distributor plate 30.

If flow distributor heads 29 per FIGS. 9 and 10 are employed instead, the circulation goes through the filter housing along the outside of the capillary or hollow fiber membranes 41 while the filtrate is discharged at the central accesses of the membrane filter modules 27 and likewise collected through the flow channels 60, to be delivered via the fixture attached to the upper flow distributor plate 30.

The fixture attached in FIGS. 1 and 2 to the upper flow distributor plate 30 could just as well also be attached to the lower flow distributor plate 30.

The discharged quantity of filtrate is replenished by the feed pump 25 from the liquid tank 23 into the liquid circulation. The increasing concentration of turbid matter caused thereby in the circulating liquid makes it necessary to interrupt operations from time to time to empty and clean the system. But it is also possible with the machine illustrated to drain and collect a part of the circulating liquid or to feed it to another filtering device.

Variations and modifications are possible without departing from the spirit of the invention.

Each and every one of the appended claims defines an aspect of the invention which is separate and distinct from all others, and accordingly it is intended that each claim be treated in this manner when examined in the

List of reference symbols

21 Membrane filtering machine
22 Machine frame
23 Liquid tank
24 Circulating pump
25 Feed pump
26 Filtering system
27 Membrane filter module
28a, b Filter housings
29a, b Flow distributor heads
30 Flow distributor plates
31 Carrying frame for 30
32 Connections for liquid circulation
33 Filtrate discharge
34 Aerating and venting connection
35 Seating holes
36 Carrying and tension rods
37 Intermediate tension plates
38 End tension plate
39 Tensioning spring
40 Tightening nut
41 Capillary or hollow fiber membranes
42 Central access
43 Annular access
44a, b Inner sleeve
45a, b Outer sleeve
46 Interior of housing
47 Plug
48 O-ring seal
49 Conical wall
50 Free space
51 Outer peripheral surface of 45a of 45b
52 O-Ring seal
53 Spacer web
54 Alloy steel ring
55 Flow breaker
55a Spiral flow breaker
55b Peripheral rib type flow breaker
55c Fish-bone rib type flow breaker
55d Peripheral rib type flow breaker
56 Seating hole or flow channel
57 Side surfaces
58 Side surfaces
59 Flow channel of large section
60 Flow channel of smaller section
61 Inner sleeve
62 Central chamber or flow channel
63 Annular chamber
64 Circumferential wall
65 Alloy steel rings
66 Alloy steel rings
67 Eye
68 Aseptic sealing ring
69 Intermediate channel
70 Intermediate channel
71 Cutout
72 Recess in 30
73a Insert
73b Insert
74 Passage
75 Connecting hole
76 Central connection
77 Eye
78 Passage
79 Passage
80 Sealing slot for sealing ring

What is claimed is:

1. A membrane type filtering device for the micro filtration of fluids, said filtering device having an elongate filter module (27) which includes a plurality of bundled stem-like tubular membranes (41) disposed in a tubular filter housing (28a, 28b), said filtering device further including flow distributor heads (29a, 29b) attachable to filter-housing ends, and including assemblages of flow distributor plates (30) and associated line connectors (32), said assemblages being attachable to said flow distributor heads (29a, 29b) so as to enable a controlled fluid circulation to be had through the said filter module and thereby effect controlled replenishment of fluid to be treated and also discharge of the filtrate and substances filtered out, characterized by means for providing the option to conduct fluid to be treated either through the interior or over the exterior of said tubular membranes (41), including:

a) said filter module having at each end means providing two access passages (42, 43), said access passages (42, 43) being hydraulically sealed from each other, b) one of said access passages (42) at each end of said filter module leading to the adjoining end faces of said bundled membranes (41), said membranes being so sealed to one another as to form a fluid-tight plug (47) at both said end faces without obstructing flow to the interiors of the membranes (41), c) the other of said access passages (43) at each end of said filter module communicating with the interior (46) of the filter housing (28a, 28b) and with the outer sides of the tubular membranes (41), d) said flow-distributor heads (29a, 29b) comprising two pairs which are interchangeably attachable either one pair of the other to the respective ends of the filter module (27), said flow distributor head (29a, 29b) each having a first pair of flow channels (62, 63) which are respectively connectable to the access passages (42, 43) of the filter module and having a second pair of flow channels (59, 60) which are adapted for respective communication with said line connectors for the purpose of carrying filtrate and non-filtrate fluids, e) said first pairs (62, 63) of flow channels of the distributor heads (29a, 29b) having outward-facing portions characterized by given and prefixed orientations with respect to the exterior of said flow-distributor heads to enable the heads to be interchangeable on the modules, f) said first pair of flow channels (62, 63) of one (29a) of said pairs (29a, 29a) of heads being respectively connected to said second pair (59, 60) of flow channels that one (29a) of the pairs (29a, 29a) of heads in one given order, g) said first pair of flow channels (62, 63) of the other pair (29b) of heads (29b, 29b) being connected to said second pair (59, 60) of flow channels of that other one (29b) of the pairs (29b, 29b) of heads in an order which is the reverse of said first given order, h) said first and second pairs of flow channels of each head being respectively hydraulically isolated from each other.

2. A filtering device as in claim 1, wherein:

a) a pair of free spaces (50, 63; 42, 62) is formed, respectively in the vicinities of the said access passages, b) said free spaces communicating respectively with the said second pair of flow channels (59, 60; or 60, 59).

3. A filtering device as in claim 1, wherein:
a) said one access passage (42) at each end of the filter module is substantially centrally disposed with respect to the axis of the filter housing and surrounded by an annular inner sleeve that extends axially inward,
b) said other access passage at each end of the filter module surrounding said annular sleeve and being in turn surrounded by an outer sleeve, which has a transition piece that merges into the wall of the filter housing.

4. A filtering device as in claim 3, wherein:
a) said annular sleeve is substantially the same diameter as the wall of the filter housing but is separated at its inner end from said wall to form an annular fluid passage,
b) said outer sleeve and transition piece surrounding said annular fluid passage.

5. A filtering device as in claim 4, wherein:
a) the ends of the bundled membranes are cemented in said inner sleeves,
b) said annular fluid passage communicating with the outsides of the bundled membranes.

6. A filtering device as in claim 4, wherein:
a) said inner sleeve projects axially outward beyond said outer sleeve.

7. A filtering device as in claim 4, wherein:
a) said annular fluid passage has a flow area between 30% and 75% of the sectional area surrounded by said inner sleeve.

8. A filtering device as in claim 4, wherein:
a) the axial length of said annular fluid passage is between 30% and 75% of the inside diameter of the tubular housing wall.

9. A filtering device as in claim 3, wherein:
a) said inner sleeve has an exterior annular sealing means for engagement with the cooperable flow-distributor head.

10. A filtering device as in claim 3, wherein:
a) said filter housing is constituted of plastic substance,
b) said inner sleeve having a reinforcing ring completely imbedded in it.

11. A filtering device as in claim 3, wherein:
a) said filter housing is constituted of plastic substance,
b) said outer sleeve having a reinforcing ring completely imbedded in it.

12. A filtering device as in claim 3, wherein:
a) the said one pair (62, 63) of flow channels of each flow-distributor head (29a, 29b) comprises sealing inner and outer sleeves forming both a central chamber and an annular chamber surrounding said central chamber,
b) said sealing inner and outer sleeves telescoping respectively with the inner and outer sleeves of the filter module.

13. A filtering device as in claim 12, wherein:
a) said telescoping sleeves are capable of limited relative axial movement without adversely affecting the seals thereof.

14. A filtering device as in claim 12, wherein:
a) one (59) of said two remaining flow channels is of larger section and is connected to the part which communicates with the flow channel (62) which forms the central chamber.

15. A filtering device as in claim 3, wherein:
a) said flow-distributor heads are of inert plastic and have reinforcing elements (65, 66) in said sleeves.

16. A filtering device as in claim 1, wherein:
a) flow-modifying means are provided on the inner surface of said filter housing,
b) said flow-modifying means displacing portions of the membranes to produce turbulence in the flow.

17. A filtering device as in claim 1, wherein:
a) said filter housing is cylindrical.

18. A filtering device as in claim 1, wherein:
a) the said one pair (62, 63) of flow channels of each flow-distributor head (29a, 29b) comprises seating holes,
b) each flow-distributor head (29a, 29b) having two exterior parallel side surfaces (57, 58) and having the remaining two of said flow channels (59, 60) extending between said side surfaces in directions normal to their axes,
c) said two remaining flow channels (59, 60) connecting respectively to the flow channels of said one pair (62, 63).

19. A filtering device as in claim 18, wherein:
a) one of said side surfaces of each flow-distributor head has an aseptic sealing means (68) at one end of one of said two remaining flow channels.

20. A filtering device as in claim 18, wherein:
a) said flow-distributor heads (29a, 29b) have eyes (67) for catenation on carrying and tension rods (36).

21. A filtering device as in claim 20, wherein:
a) said filtering device comprises a plurality of said flow-distributor heads (29a, 29b) strung up on and carried by a tension rod (36), and comprises a springy tensioning device (39) to effect mutual compression of said heads.

22. A filtering device as in claim 18, wherein:
a) one (59) of said two remaining flow channels is for non-filtrate flow and has a larger cross-section than the other (60) remaining flow channel.

23. A filtering device as in claim 1, wherein:
a) said flow-distributor heads are of alloy steel.

24. A filtering device as in claim 1, wherein:
a) a plug-in insert (73a, 73b) is provided in a flow-distributor plate (30) that is connected to a distributor head,
b) said insert being adapted to the type of flow channel connections existing in said head.

25. A membrane-type filtering device for micro-filtration of fluids, comprising means contributing to providing the option to conduct fluid to be treated either through the interior or over the exterior of tubular capillary membranes, including rows of multiple membrane filter modules (27), each module (27) containing a housing (28a, 28b) having in it a bundle of said capillary membranes, and containing flow distributor heads (29a, 29b) having through channels, said heads being attached to the ends of the housings, characterized in that the flow distributor heads (29a, 29b), having the membrane filter modules (27) arranged in parallel, are strung up juxtaposed in adjacent rows according to their paired attachment to the membrane filter modules (27) and are held together in mutually sealing fashion by means of carrying and tensioning rods (36) and flexible contact pressure devices (39, 40), rigidly connected flow distributor plates (30) being attached to one set of ends of said rows of flow distributor heads (29a, 29b) and end tension plates (38) being provided which close the through channels of the other set of ends of the rows of flow distributor heads (29a, 29b), he axial spacing of the membrane filter modules (27) between the rows of flow distributor heads (29) being fixed at one end of said rows by said rigidly connected flow distributor plates (30) and at the other end of said rows by an end tension plate (38).

26. A membrane type filtering device according to claim 25, characterized in that the end tension plates (38) are provided with sealing devices to aid in the shut-off of the flow channels extending through the rows of flow distributor heads (29a, 29b).

27. A membrane-type filtering device according to claim 25, characterized in that intermediate tension plates (37) which fix the mutual spacing occupied by the membrane filter modules (27) are inserted in the rows of flow distributor heads (29a, 29b), said intermediate tension plates (37) being provided with holes (78, 79) to effect a continuation of the flow channels (59, 60) of the flow distributor heads (29a, 29b) and, on their surfaces, being provided with sealing devices for the flow channels (59, 60).

28. A membrane-type filtering device according to claim 25, characterized by an even number of rows of membrane filter modules (27) being arranged in parallelism and having one pair each of flow distributor heads (29), each head containing a nonfiltrate through flow channel (59) and a filtrate through flow channel (60), said flow distributor heads of the adjacent rows being so arranged that their filtrate flow channels (60) face each other.

29. A membrane filter module for use in membrane-type filtering devices for micro filtration of fluids comprising, means contributing to providing the option to conduct fluid to be treated either through the interior or over the exterior of tubular membranes, including a flow distributor head (29a, 29b) attached to each end of a tubular filter housing (28a, 28b) of the module, and wherein a plurality of flow distributor heads are catenated to form a row of juxtaposed membrane filter modules arranged essentially in parallelism, characterized in that there are formed, at both ends of the filter housing (28a, 28b) which accommodates a bundle of said tubular membranes (41), two accesses (42, 43) each of which is separated from the other in leakproof manner, one access (42) being central and leading to one face of the bundle, said bundle face being held together closely by cementing or fusing while leaving intact the flow connection to the interior of the tubular membranes (41) thereof, whereas the second access (43) surrounds the central access (42) annularly and leads, in sealed leakproof fashion, past the said bundle face to the interior of the filter housing (28a, 28b) which interior accommodates the bundle of tubular membranes (41).

* * * * *